No. 706,212. Patented Aug. 5, 1902.
O. BAILLARGEON.
NUT LOCK.
(Application filed Feb. 20, 1902.)
(No Model.)
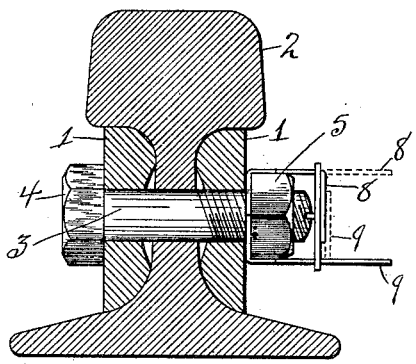
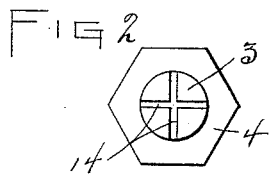 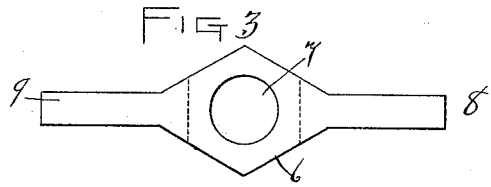
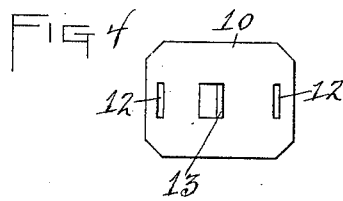 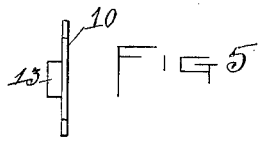
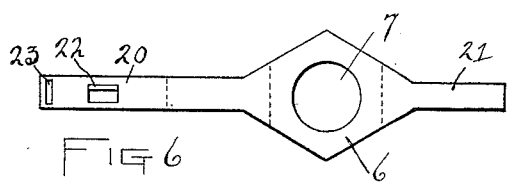 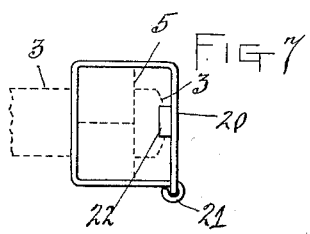
WITNESSES
Wm. J. Greer.
E. M. O'Reilly.
INVENTOR
Octav Baillargeon,
By Mosher & Curtis,
attys.
THE NORRIS PETERS CO., PHOTO-LITHO., WASHINGTON, D. C.

UNITED STATES PATENT OFFICE.

OCTAV BAILLARGEON, OF COHOES, NEW YORK.

NUT-LOCK.

SPECIFICATION forming part of Letters Patent No. 706,212, dated August 5, 1902.

Application filed February 20, 1902. Serial No. 94,861. (No model.)

*To all whom it may concern:*

Be it known that I, OCTAV BAILLARGEON, a citizen of the United States, residing at Cohoes, county of Albany, and State of New York, have invented certain new and useful Improvements in Nut-Locks, of which the following is a specification.

The invention relates to such improvements; and it consists of the novel construction and combination of parts hereinafter described and subsequently claimed.

Reference may be had to the accompanying drawings and the reference characters marked thereon, which form a part of this specification.

Similar characters refer to similar parts in the several figures.

Figure 1 of the drawings is a view in cross-section of a railway-rail and fish-plates secured by a bolt and nut provided with my improved locking mechanism. Fig. 2 is an end view of the bolt detached. Fig. 3 is a plan view of the nut-locking yoke detached and laid out flat. Fig. 4 is a plan view of the inner side of the keeper detached. Fig. 5 is an edge view of the same. Fig. 6 is a plan view of a modified construction showing the yoke and keeper in one piece detached and laid out flat. Fig. 7 is an edge view of the same bent to the position occupied in use, the relative position of the bolt and nut being indicated by dotted lines.

I have shown in Fig. 1 a pair of fish-plates 1, secured to the opposite sides of a railway-rail 2 by means of a screw-threaded bolt 3, having the bolt-head 4 and a similarly-threaded nut 5, and have shown in connection therewith my improved locking mechanism, which consists of the sheet-metal yoke 6, having a plate-receiving aperture 7, and arms 8 and 9 and a keeper 10, provided with the apertures 12, adapted to receive the arms 8 and 9 of the yoke. The keeper is also provided with a flange or projection 13, which is struck out from the body of the sheet metal from which the keeper is formed and is adapted to enter and fit one of the cross-grooves 14, formed in the threaded nut of the bolt.

The nut 5 is made hexagonal, like the head of the bolt, as shown in Fig. 2, having six plane sides.

The operation of the mechanism is as follows: After the bolt has been inserted in the position shown in Fig. 1 the apertured yoke is slipped onto the projecting threaded end of the bolt and the nut then screwed onto the bolt until the yoke is tightly pressed between the nut and the adjacent fish-plate. The yoke-arms 8 and 9 are then bent up against two of the plane sides of the nut, one arm on one side of the nut and the other arm on the opposite side of the nut. The keeper (shown in Fig. 4) is then slipped onto the projecting arms until the flange 13 enters one of the cross-grooves in the end of the bolt. That portion of the arms which projects beyond the keeper is then bent down upon the keeper, as shown in Fig. 1, the arm 8 being shown in the bent-down position by solid lines and in the projecting position by the dotted lines, while the arm 9 is shown in the projecting position by the solid lines and in the bent-down position by the dotted lines. The yoke-arms are thus held by the keeper in a locking position in engagement with the plane sides of the nut, thereby preventing the nut from rotating on the bolt, and the keeper is held in engagement with the cross-groove bolt by the yoke-arms passing through the keeper and bent down upon it, as shown by the solid and dotted lines, thereby locking the keeper to the bolt, whereby the keeper and through it and the yoke-arms interlocked therewith the nut is held in fixed relation to the bolt and prevent it from turning thereon.

When desired, the yoke and keeper can be made of one integral piece of sheet metal, as shown in Fig. 6, one of the yoke-arms 20 being made wider than the other arm 21 and provided with a projecting flange 22, adapted to enter the cross-groove of the bolt, and with the aperture 23, adapted to receive the other yoke-arm 21, so that in operation and use the wider yoke-arm is bent over the nut and cross-groove bolt until the projection 22 enters the cross-groove and the narrow yoke-arm has entered the aperture 23, after which the projecting end of the narrow arm of the yoke is bent around the end of the wider arm, all as shown in Fig. 7, in which the relative positions of the nut and bolt are indicated by dotted lines.

What I claim as new, and desire to secure by Letters Patent, is—

The combination with a threaded bolt having a cross-groove in its threaded end and a similarly-threaded nut having a plurality of plane sides; of a sheet-metal yoke having a bolt-receiving aperture and extended arms engageable with the plane sides of the nut; and a keeper having a part adapted to enter the cross-groove of the bolt and provided with means for connecting the yoke-arms therewith whereby the keeper is adapted to hold the yoke-arms interlocked with the plane sides of the nut, and the arms to hold the keeper interlocked with the bolt, substantially as described.

In testimony whereof I have hereunto set my hand this 12th day of February, 1902.

OCT. BAILLARGEON.

Witnesses:
FRANK C. CURTIS,
GEO. A. MOSHER.